United States Patent
Nurminen et al.

(10) Patent No.: US 7,257,627 B2
(45) Date of Patent: Aug. 14, 2007

(54) PARTITIONING OF A COMMUNICATIONS NETWORK

(75) Inventors: Jukka Nurminen, Espoo (FI); Harri Korpela, Espoo (FI)

(73) Assignee: Nokia Corporation, Espoo (FI)

( * ) Notice: Subject to any disclaimer, the term of this patent is extended or adjusted under 35 U.S.C. 154(b) by 736 days.

(21) Appl. No.: 10/296,808

(22) PCT Filed: Apr. 26, 2001

(86) PCT No.: PCT/FI01/00403

§ 371 (c)(1),
(2), (4) Date: Nov. 27, 2002

(87) PCT Pub. No.: WO01/93504

PCT Pub. Date: Dec. 6, 2001

(65) Prior Publication Data

US 2003/0145107 A1 Jul. 31, 2003

(30) Foreign Application Priority Data

May 31, 2000 (FI) .................................. 20001314

(51) Int. Cl.
*G06F 15/173* (2006.01)
(52) U.S. Cl. ........................................ 709/223; 370/254
(58) Field of Classification Search ................ 709/223; 370/254
See application file for complete search history.

(56) References Cited

U.S. PATENT DOCUMENTS

| | | | | |
|---|---|---|---|---|
| 5,586,254 A | * | 12/1996 | Kondo et al. ................ | 714/25 |
| 5,687,292 A | * | 11/1997 | Boda et al. ................... | 706/10 |
| 5,764,740 A | * | 6/1998 | Holender ................ | 379/112.05 |
| 5,774,689 A | * | 6/1998 | Curtis et al. .................. | 703/21 |
| 5,854,903 A | * | 12/1998 | Morrison et al. ........... | 709/249 |
| 6,065,063 A | | 5/2000 | Abali | |
| 6,151,305 A | * | 11/2000 | Chen .......................... | 370/238 |
| 6,240,463 B1 | * | 5/2001 | Benmohamed et al. ..... | 709/238 |
| 6,331,986 B1 | * | 12/2001 | Mitra et al. ................. | 370/468 |
| 6,732,170 B2 | * | 5/2004 | Miyake et al. .............. | 709/223 |
| 6,850,965 B2 | * | 2/2005 | Allen ......................... | 709/203 |
| 7,103,003 B2 | * | 9/2006 | Brueckheimer et al. .... | 370/252 |
| 2002/0087370 A1 | * | 7/2002 | Brueckheimer et al. ....... | 705/7 |

FOREIGN PATENT DOCUMENTS

| | | |
|---|---|---|
| WO | WO 95/34981 | 12/1995 |
| WO | WO 98/47265 | 10/1998 |

* cited by examiner

*Primary Examiner*—Bunjob Jaroenchonwanit
*Assistant Examiner*—Julian Chang
(74) *Attorney, Agent, or Firm*—Squire, Sanders & Dempsey L.L.P.

(57) ABSTRACT

This invention relates to the partitioning of a communications network. The idea of the invention is to divide the logical connections of a communication network into several partitions, each partition representing a certain type of transmission traffic, such as access or regional traffic. The partitioning is based on simple criteria: capacity of an endpoint of a logical connection, representing a node; distance between a pair of endpoints, and traffic category representing the stability of the traffic. By using the partitioning, it is possible to separate a certain type of traffic (a certain type of logical connections) from the whole traffic picture of the network.

26 Claims, 3 Drawing Sheets

PARTITIONING OF A COMMUNICATIONS NETWORK

FIELD OF THE INVENTION

This invention relates to the partitioning of a communications network.

BACKGROUND OF THE INVENTION

A network planning process involves several competing targets. The network should be compact and flexible to operate, and easy to expand. The network capacity and investments are planned to follow the expected transmission needs and the actual sales of transport services. There exist many alternative architectures to realize the network.

The first network investment of the operator must be reasonable in size, but big enough to ensure credibility and the near future growth of the network. In other words, a certain minimum coverage of the network is needed, and the growth of the network must be secured technically and economically at the same time.

Usually, these matters mean the need of building the network gradually, to add and modify network nodes and transmission lines. The changes in the network nodes can be frequent, which means repetitive additions of equipment, changes in the use of existing equipment, the increase of capacity, and adding more line interfaces. Usually, the changes also mean changes in synchronization paths and in network management channels.

Problems arise when the required changes are not possible to do in the existing nodes, or they can be done, but the existing resources are not used efficiently. For example, more capacity is needed in a node and thus new equipment must be added into the node, but there is no free space inside the rack. Or the added transmission capacity is for low capacity access traffic, but the node is capable of handling high capacity regional traffic, when the node is too big and expensive to handle just access traffic. In other words, the changes and the existing equipment must match with each other. Frequent changes in the future should be taken into account. The traffic in the network can be high or low capacity traffic, and dynamic or stable traffic in relation to the time period. The objective of the invention is to alleviate the above-mentioned drawbacks. This is achieved in a way described in the claims.

SUMMARY OF THE INVENTION

The idea of the invention is to divide the logical connections of a communication network into several partitions, each partition representing a certain type of transmission traffic, such as access or regional traffic. The partitioning is based on simple criteria: capacity of an endpoint of a logical connection, representing a node; distance between a pair of endpoints, and traffic category representing the stability of the traffic. By using the partitioning, it is possible to separate a certain type of traffic (a certain type of logical connections) from the whole traffic picture of the network. The partition offers a useful way for the designer of the network to decide what equipment is placed in each node, taking into account the costs and future growth.

BRIEF DESCRIPTION OF THE DRAWINGS

In the following the invention is described in more detail by means of FIGS. 1-2 in the attached drawings where.

DETAILED DESCRIPTION OF THE INVENTION

Figure 1:
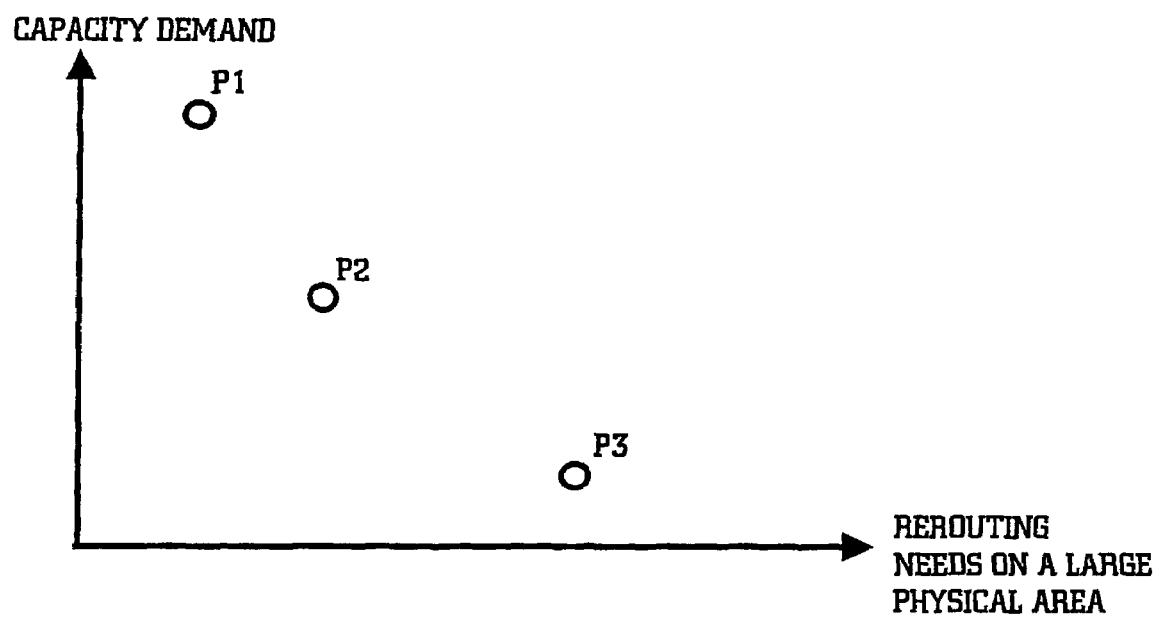
FIG. 1 illustrates different types of transmission traffic.

FIG. 1 illustrates what different types of transmission traffic can be found in a communication network. The vertical axis shows the capacity demand of the traffic, and the horizontal axis shows the need of rerouting in a large physical area, i.e. the stability of the traffic. P1 represents large capacity traffic, such as optical trunk traffic. Usually the optical traffic between endpoints in the backbone trunks of a communications network is stable, i.e. there is no need for rerouting traffic in a large physical area in relation to a certain period. P2 represents traffic in a regional level (such as a city area). Capacity needs are not as high as P1 has, but the traffic is more dynamic. P3 represents low capacity traffic, such as leased cellular network traffic for small businesses. In this case the need for rerouting is very high.

The starting point for the whole network plan is all desired logical connections (traffic requirements) that specify the endpoints of the logical connections, capacity of the endpoints, and the descriptive category (traffic type) of the logical connections (e.g. mobile phone traffic, interswitch traffic, data, leased line). The goal of the partition process is to divide the logical connections into separate partitions. The criteria that define a good partition are:

1. Equipment capacity is efficiently used. Not too low to get a good utilization percentage, and not too high to have some room for growth. The growth estimates are different for different types of traffic.
2. The length of routes are as short as possible. This is because longer routes require more intermediate equipment and thus increase the cost. Long routes are also more likely to be broken by some accident.
3. It is useful to separate the traffic with a certain stability from the traffic with other stabilities.

Since the above criteria require that a detailed plan for the partitioning is available, it is impossible to use those criteria directly in the partitioning process. Therefore the following simpler criteria must be used:

1. The capacity of the endpoints of a logical connection in a single partition is between given limits.
2. The distances between pairs of endpoints in a single partition are between given limits.
3. A single partition contain a specific category of logical connections (traffic type). The category can be used to deduce how likely it is that the endpoints of the connection are going to change. E.g. traffic between PSTN switches in large cities is very stable and high capacity while leased line traffic used e.g. by a group of shops is likely to change.

Special software can do the partition for separating the desired traffic from the logical connections. The designer chooses the capacity and distance limits, and the right category. By using the partition, it is easier for the designer to plan the network, taking into account different traffic types, equipment costs, and future growth.

Figure 2:
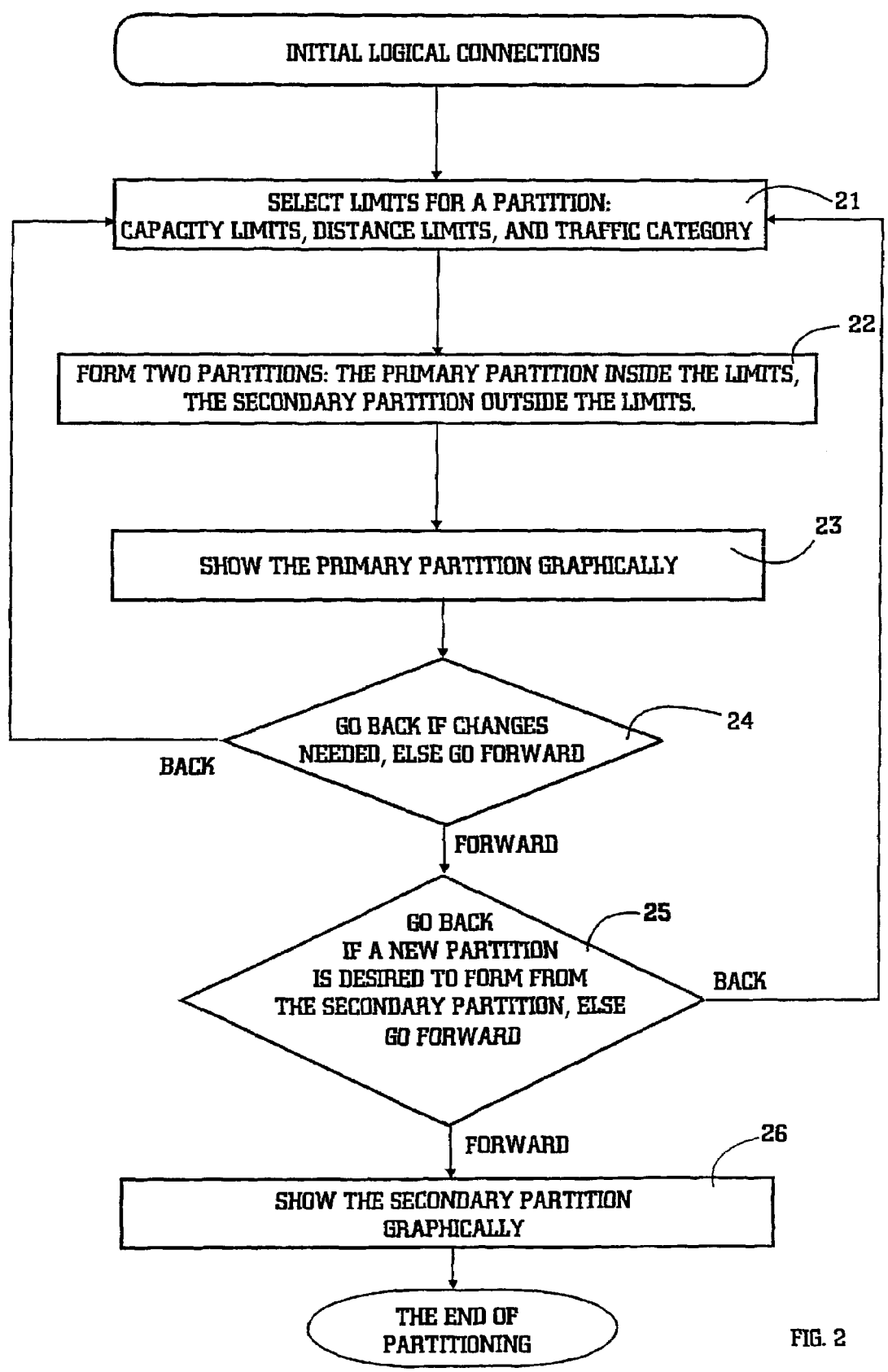
FIG. 2 illustrates the inventive method as a flow chart.

FIG. 2 illustrates the invention as a flow chart. The input information is the logical connections of the network. The information contains all traffic demands for all kinds of traffic types. The software offers a possibility to select limits (21) for finding certain logical connections from all the logical connections. The limits are based on the above-mentioned simple criteria. After selecting the limits, the software forms two partitions (22): the primary partition which contains the logical connections inside the selected limits, i.e. the partition which is desired to be formed first, and the secondary partition, which is the rest of the logical connection outside the selected limits. The software shows (23) graphically the primary partition to the designer, who can decide if the primary partition is acceptable. If the designer wants to change the partition made, it can be repeated (24). If the designer is satisfied with the partition, a new partition from the secondary partition can be formed (25). The same steps (21,22,23,24) are done for the new partition: selecting limits, forming two partitions, showing the primary desired partition (the latest one) graphically, and changing the partition, if needed. The partition of the secondary partition can be repeated until all desired traffic types have been separated into the separate partitions. The last partition is the latest secondary partition, which is shown graphically (26) finally. The minimum number of partitions is two when the secondary partition is shown graphically after the primary partition is accepted. In this case new partitions from the secondary partition (25) are not required.

Figure 3:
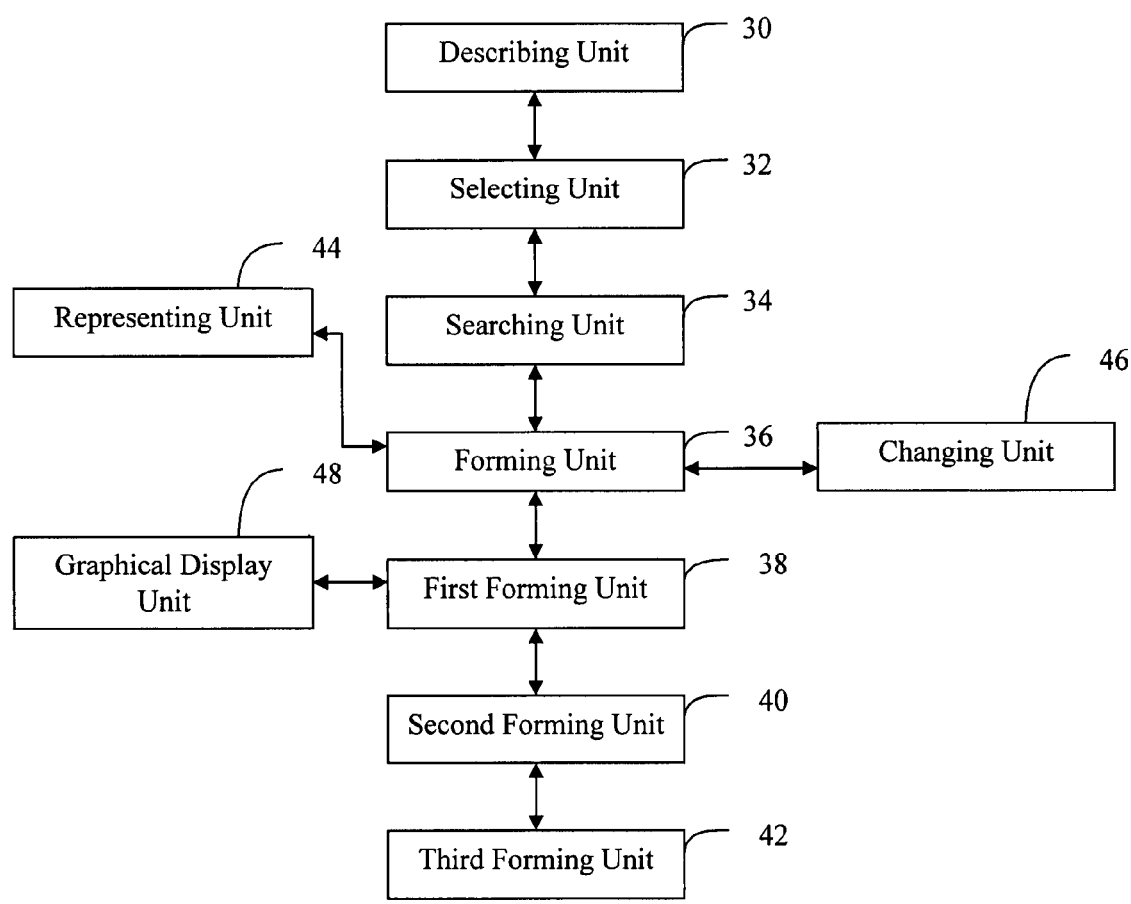
FIG. 3 illustrates a network planning system for partitioning a communication network, in accordance with an embodiment of the present invention.

FIG. 3 illustrates a network planning system for partitioning a communication network, in accordance with an embodiment of the present invention. A describing unit 30 is configured to describe logical connections in a network in a domain comprising at least two dimensions, the first dimension being for describing capacity needs of endpoints of the logical connections, and the second dimension being for describing re-routing needs of the logical connections. A selecting unit 32 is configured to select a value range for each of the dimensions and a searching unit configured to search for logical connections which are within the selected value ranges in the domain. A forming unit 34 of the network planning system is configured to form a primary partition from the logical connections within the selected value ranges, the primary partition being useful for deciding what equipment to place in at least one endpoint.

The network planning system also includes a first forming unit 38 configured to form a secondary partition from logical connections which fail to belong to the primary partition. A second forming unit 40 is configured to form a new partition from the secondary partition, wherein logical connections not belonging to the new partition form a latest secondary partition. A third forming unit 42 is configured to form another new partition from the logical connections of the latest secondary partition. A representing unit 44 in the network planning system is configured to represent the primary partition graphically. A changing unit 46 is configured to change the primary partition and a graphical display unit 48 is configured to display the secondary partition graphically.

After the partition process, the designer can route and equip the network nodes separately in each partition. The partitions are connected together for getting the whole picture of the network. The inventive software and the method offer an effective way to take into account different requirements of network planning: future growth, cost-effectiveness, reliability matters, and so on. Thus, the present invention provides a network planning method and system for partitioning a communication network, which describe logical connections in a network in a domain comprising at least two dimensions. The first dimension describes a capacity of endpoints of said logical connections, and the second dimension describes re-routing needs of said logical connections. The network planning method and system select a value range for each of the dimensions and search for logical connections which are within the selected value ranges in the domain. The network planning method and system further form a primary partition from the logical connections within the selected value ranges to enable routing and equipping at least one network node in the primary partition.

Although, the invention is described in a way that three parameters (capacity, distance, and traffic type) are taken into account in the partitioning, it is possible to use another number of parameters, such as only two parameters: capacity and traffic type. Or it is possible to use more than three parameters for forming a desired multidimensional domain for the limits using in the partitioning. The invention is a method that can be used in many implementations and network solutions, in the scope of the inventive idea.

The invention claimed is:

1. A network planning method for partitioning a communication network, said method comprising:
    describing logical connections in a network in a domain comprising at least two dimensions, the first dimension being for describing capacity needs of endpoints of said logical connections, and the second dimension being for describing re-routing needs of said logical connections;
    selecting a value range for each of the dimensions;
    searching for logical connections which are within the selected value ranges in the domain;
    forming a primary partition from the logical connections within the selected value ranges;
    using the primary partition to decide what equipment is placed in at least one endpoint; and
    equipping said at least one endpoint.

2. A method according to claim 1, further comprising representing the primary partition graphically.

3. A method according to claim 1, further comprising forming a secondary partition from logical connections which fail to belong to the primary partition.

4. A method according to claim 3, further comprising forming a new partition from the secondary partition, wherein logical connections not belonging to the new partition form a latest secondary partition.

5. A method according to claim 4, further comprising repeating the forming of a new partition from the logical connections of the latest secondary partition.

6. A method according to claim 3, further comprising showing the secondary partition graphically.

7. A method according to claim 1, further comprising changing the partition made.

8. A method according to claim 1, wherein the describing of the logical connections is performed wherein the domain comprises a third dimension that describes the distance between endpoints of said logical connections.

9. A network planning system for partitioning a communication network, said system comprising:
    describing means for describing logical connections in a network in a domain comprising at least two dimensions, the first dimension being for describing capacity needs of endpoints of said logical connections, and the second dimension being for describing re-routing needs of said logical connections;
    selecting means for selecting a value range for each of the dimensions;
    searching means for searching for logical connections which are within the selected value ranges in the domain; and forming means for forming a primary partition from the logical connections within the selected value ranges, said primary partition to determine what equipment to place in at least one endpoint.

10. A system according to claim 9, further comprising representing means for representing the primary partition graphically.

11. A system according to claim 9, further comprising first forming means for forming a secondary partition from logical connections which fail to belong to the primary partition.

12. A system according to claim 11, further comprising second forming means for forming a new partition from the secondary partition, wherein logical connections not belonging to the new partition form a latest secondary partition.

13. A system according to claim 12, further comprising third forming means for forming another new partition from the logical connections of the latest secondary partition.

14. A system according to claim 11, further comprising graphical display means for displaying the secondary partition graphically.

15. A system according to claim 9, further comprising changing means for changing the partition.

16. A system according to claim 9, wherein said describing means is configured to describe logical connections in the network in a domain which comprises a third dimension that describes the distance between end points of the logical connections.

17. A network planning system for partitioning a communication network, said system comprising:
 a describing unit configured to describe logical connections in a network in a domain comprising at least two dimensions, the first dimension being for describing a capacity needs of endpoints of said logical connections, and the second dimension being for describing re-routing needs of said logical connections;
 a selecting unit configured to select a value range for each of the dimensions;
 a searching unit configured to search for logical connections which are within the selected value ranges in the domain; and
 a forming unit configured to form a primary partition from the logical connections within the selected value ranges, said primary partition to determine what equipment to place in at least one endpoint.

18. A system according to claim 17, further comprising a representing unit configured to represent the primary partition graphically.

19. A system according to claim 17, further comprising a first forming unit configured to form a secondary partition from logical connections which fail to belong to the primary partition.

20. A system according to claim 19, further comprising a second forming unit configured to form a new partition from the secondary partition, wherein logical connections not belonging to the new partition form a latest secondary partition.

21. A system according to claim 20, further comprising a third forming unit configured to form another new partition from the logical connections of the latest secondary partition.

22. A system according to claim 17, further comprising a changing unit configured to change the partition.

23. A system according to claim 19, further comprising a graphical display unit configured to display the secondary partition graphically.

24. A system according to claim 17, wherein said describing unit is configured to describe the logical connections in the network in a domain which comprises a third dimension that describes the distance between end points of the logical connections.

25. An apparatus configured to search for logical connections having first and second dimensions which are within respective selected value ranges, said first dimension being for describing a capacity needs of endpoints of said logical connections, and said second dimension being for describing re-routing needs of said logical connections, and form a primary partition from the logical connections within the selected ranges, said primary partition to determine what equipment to place in at least one endpoint.

26. A computer program embodied on a computer-readable medium, the computer program being configured to control a processor to search for logical connections having first and second dimensions which are within respective selected value ranges, said first dimension being for describing a capacity needs of endpoints of said logical connections, and said second dimensions being for describing re-routing needs of said logical connections, and form a primary partition from the logical connections within the selected value ranges, said primary partition used to determine what equipment to place in at least one endpoint.

* * * * *